United States Patent [19]
Beisel

[11] Patent Number: 5,311,506
[45] Date of Patent: May 10, 1994

[54] SWITCHING NETWORK FOR SWITCHING CHANNELS

[75] Inventor: Werner Beisel, Altenstadt, Fed. Rep. of Germany

[73] Assignee: Alcatel N.V., Amsterdam, Netherlands

[21] Appl. No.: 887,075

[22] Filed: May 22, 1992

[30] Foreign Application Priority Data

May 24, 1991 [DE] Fed. Rep. of Germany ....... 4116939

[51] Int. Cl.$^5$ ............................................ H04Q 11/04
[52] U.S. Cl. .................................................. 370/58.1
[58] Field of Search ..................... 370/58.1, 58.2, 58.3, 370/60, 60.1, 66, 68, 94.1, 94.2

[56] References Cited

U.S. PATENT DOCUMENTS

| | | | |
|---|---|---|---|
| 4,093,827 | 6/1978 | Charransol et al. | 370/66 |
| 4,131,763 | 12/1978 | Herschtal | 370/66 |
| 4,392,221 | 7/1983 | Hesketh | 370/58.1 |
| 4,450,557 | 5/1984 | Munter | 370/67 |
| 4,512,014 | 4/1985 | Binz et al. | 370/68 |

FOREIGN PATENT DOCUMENTS

| | | |
|---|---|---|
| 0024708 | 8/1980 | European Pat. Off. |
| 0053267 | 6/1982 | European Pat. Off. |
| 0378122 | 1/1990 | European Pat. Off. |
| 3609733 | 10/1987 | Fed. Rep. of Germany |
| 02462835 | 3/1981 | France |
| 8807298 | 9/1988 | PCT Int'l Appl. |
| 2014018 | 8/1979 | United Kingdom |
| 2026285 | 1/1980 | United Kingdom |

OTHER PUBLICATIONS

English language translation of French Patent No. 9000991.
IEEE Journal on selected Areas in communications. BD 6, NR 9, Dec. 1988. Seiten 1528-1537, XP112418 Devault et al "The Prelude" ATD Experiment; Assemmments and Future Prospects.

Primary Examiner—Douglas W. Olms
Assistant Examiner—Hassan Kizou

[57] ABSTRACT

In a data transmission system, a switching network in a connection node (VK) includes switch groups (SCH) for switching channels, which are each assigned to one or more time slots within the framework of a multiplex time signal, e.g. virtual containers of a STM-1 frame according to CCITT recommendations G707 to G.709. Each switch group (SCH) is modular and linked to one another, and contains a memory (DS) with several independently readable memory outputs (SA1 to SA4), through which the storage area can be accessed. Each part signal of a respective memory address can be connected with a data output of the switch group (SCH) through selectors (SEL1 to SEL4). A connecting memory (VB1 to VB4) controls the reading of each part signal from the memory (DS) to a memory output (SA1 to SA4) and a selector (SEL1 to SEL4). A coupling field may be composed of switch groups (SCH) arranged in columns and lines, as required. Each data outputs (DA1 to DA4) of one switch group (SCH MN) is connected to a connection input (VE1 to VE4) of the following switch group.

12 Claims, 5 Drawing Sheets

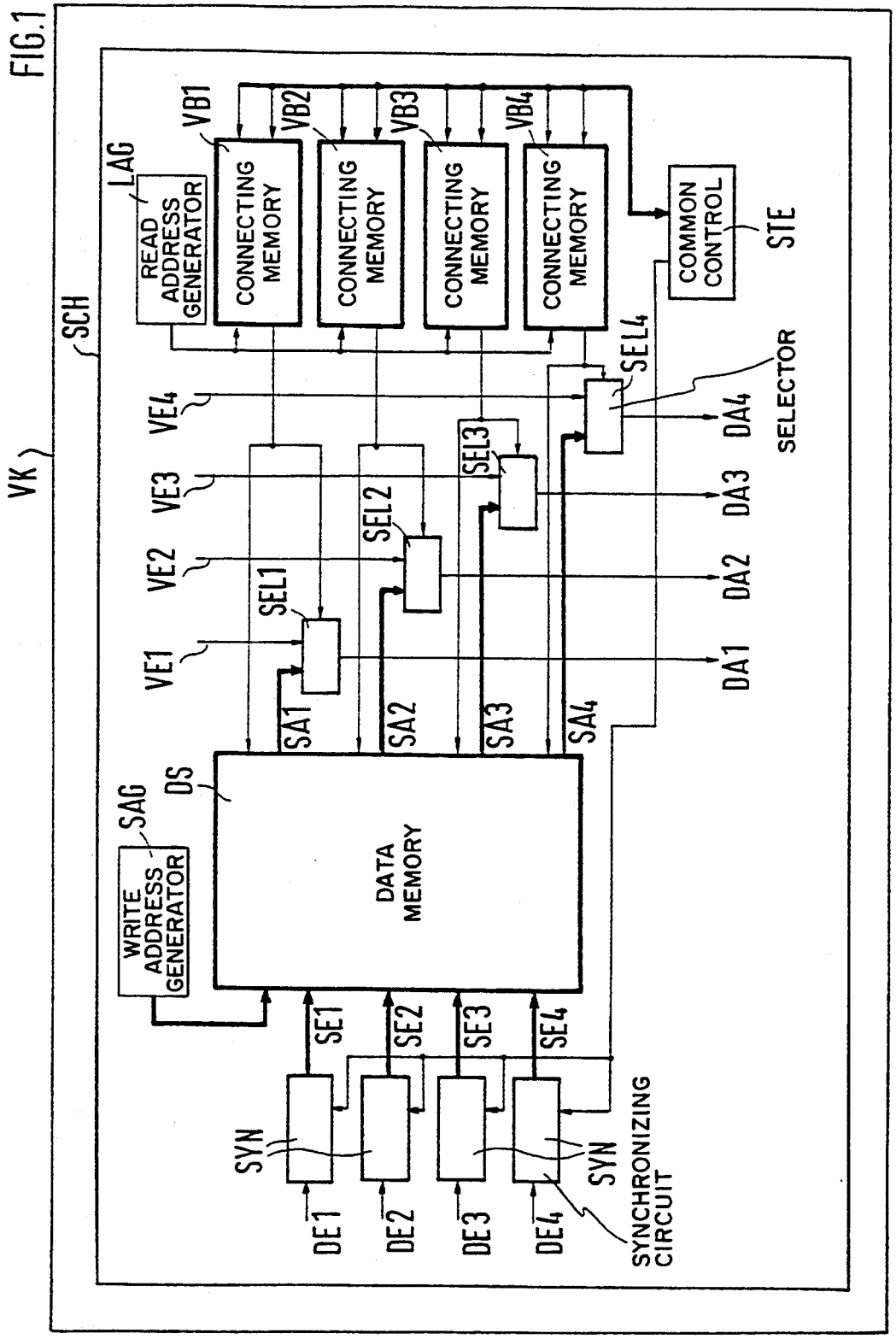

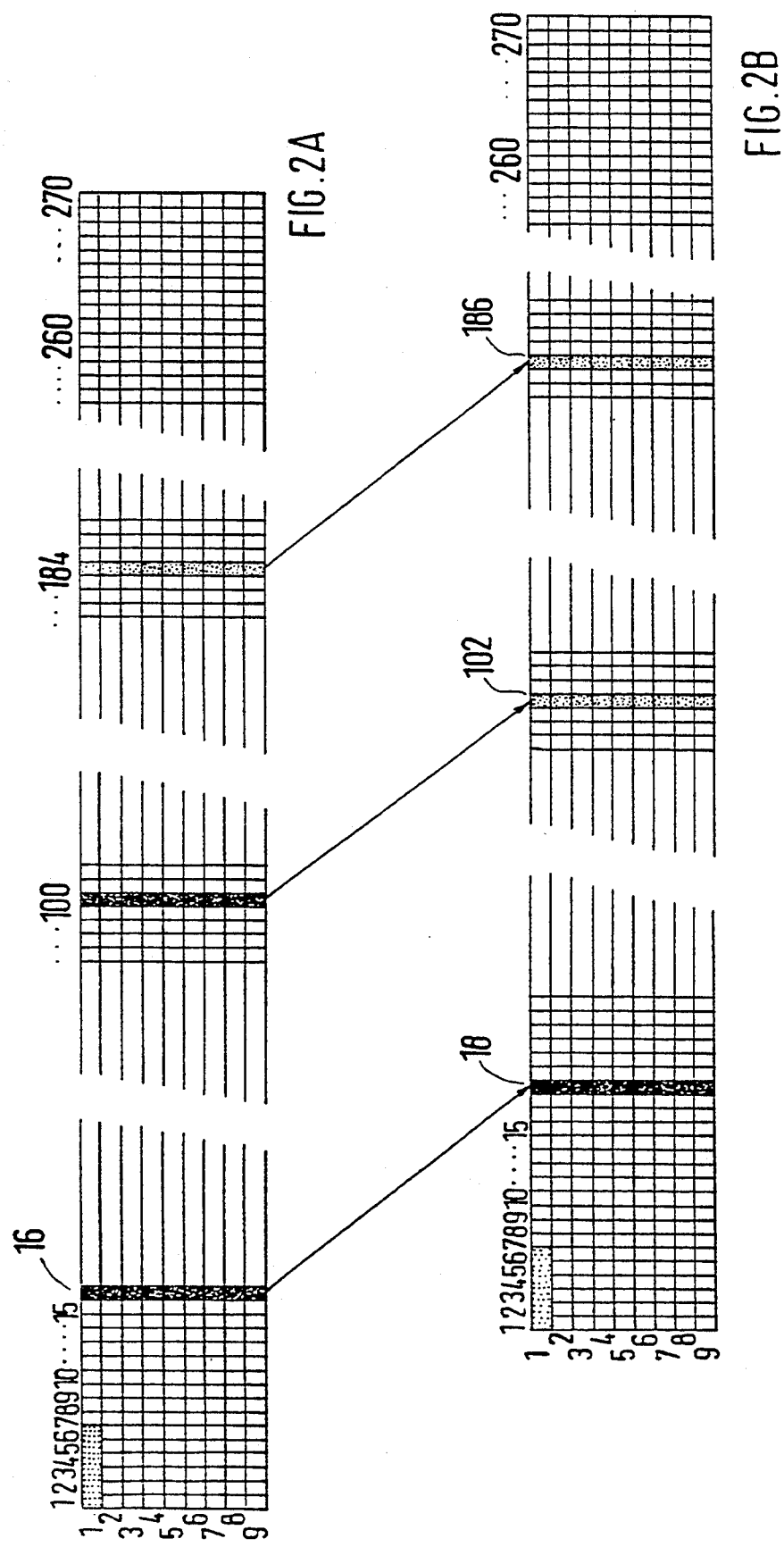

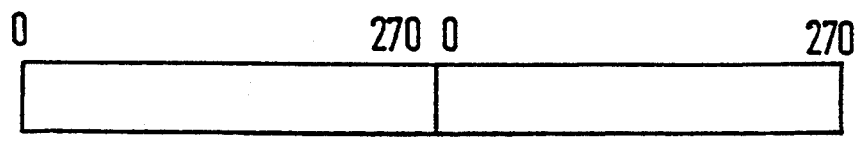
FIG.3A
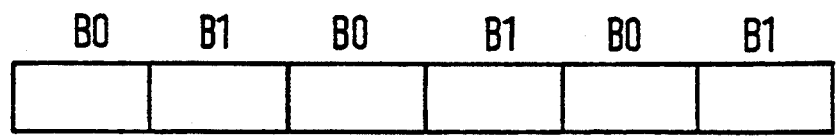
FIG.3B
FIG.3C
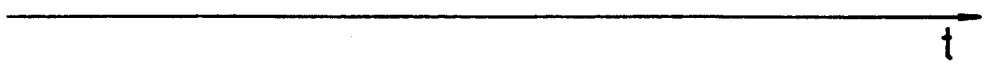
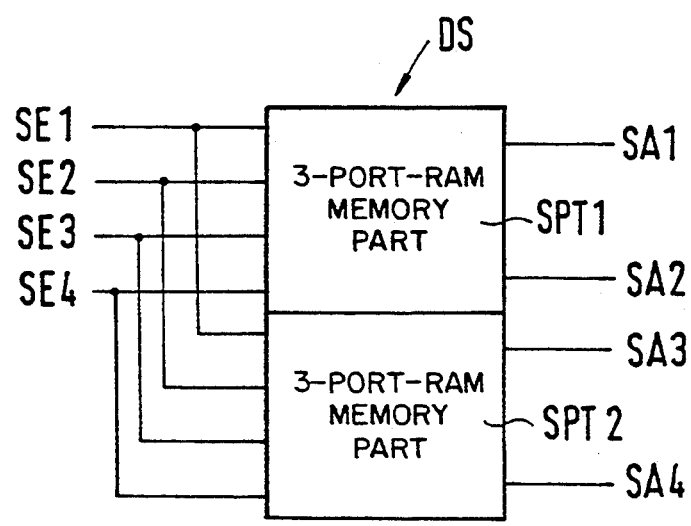
FIG.4

SWITCHING NETWORK FOR SWITCHING CHANNELS

FIELD OF THE INVENTION

The invention concerns a switching network for the connection nodes of a data transmission network for switching channels, which are associated with one or more time slots within the framework of a multiplex time signal.

BACKGROUND ART

Connection nodes are used for digital transmission networks of the "synchronous digital hierarchy" type (SDH). The connection nodes make it possible to switch multiplex signals to different connection paths.

According to CCITT recommendations G.707, G.708 and G.709, multiplex signals consist of so-called containers in which the signals to be transmitted are located. One or more channels are transmitted to each container. A supplemental signal (POH) is added to each container to turn it into a so-called virtual container (VC). A so-called head part (SOH) completes the virtual container (VC), converting it into a STM-N multiplex frame.

The connection nodes now make switching individual containers to a STM-N multiplex frame, or also between different STM-N multiplex frames, possible.

Such connection nodes find application in "plesiochronous" (nearly synchronous) transmission networks, or in transmission networks consisting of both plesiochronous and synchronous network components.

The switching network of such a connection node is known from EP 0,378,122 A1. For switching, the known switching network has switching groups that consist of a number of switching elements. Each switching element has a memory for the intermediate storage of data. The switching elements are arranged in lines and columns, where all switching elements of a line are connected with one data input of the switching group, and all switching elements of a column are connected with one data output of the switching group, and the same data are stored in each switching element of a line. Each switching element is connected to a joint memory, which transmits the read address to the switching element, and where the sequence of the channels to be read is determined in this manner. The columnar arrangement of the switching elements permits reading the data of each data input in each data output.

Thus, in the known switching network, because of the distribution of the channels of one frame to all outputs of the switching network, it is necessary for the data to be intermediately stored in as many memory elements as the switching network has data outputs. This requires large storage capacity and a correspondingly high cost for reading the memory, which is a particular disadvantage with high bit rate frequencies and/or parallel data processing.

The invention has therefore the task of producing a switching network of simple construction.

SUMMARY OF THE INVENTION

A connection node (VK) of a data transmission system for switching channels, which are assigned to one or more time slots within the framework of a multiplex time signal, e.g. virtual containers of an STM-1 frame according to CCITT Recommendations G.707 to G.709, has a switching network that consists of switch groups (SCH).

The switch groups (SCH) are modular and are linked to each other. Each of the switch groups (SCH) contains a memory (DS) with several independently readable memory outputs (SA1 to SA4), through which the storage area can be accessed. Each of the part signals of each memory address can be connected with a data output of the switch group through selectors (SEL1 to SEL4). The reading is controlled by a connecting memory (VB1 to VB4), which is assigned to a memory output (SA1 to SA4) and a selector (SEL1 to SEL4).

The switching network may be composed of switch groups arranged in columns and lines, as required. The data inputs (DE1 to DE4) of the switch groups (SCH) in one line are in parallel with one input of the switching network. Each of the data outputs of one switch group (SCH MN) is connected to a connection input (VE1 to VE4) of the following switch group.

BRIEF DESCRIPTION OF THE DRAWINGS

The invention and advantageous configurations are described below by means of FIGS. 1 to 6, where:

FIG. 1 is a block diagram of a first switch group configuration.

FIGS. 2(A and B) is the structural representation of an STM-1-multiplex time frame with switched channels, FIGS. 3A to 3C represent one line of an STM-multiplex frame, distributed into two different blocks of the intermediate memory, and a type of read address information of the blocks, according to the invention, by inverting the address of each second frame.

FIG. 4 is the intermediate memory of a switch group shown in block diagram form.

BEST MODE FOR CARRYING OUT THE INVENTION

Figure 5:
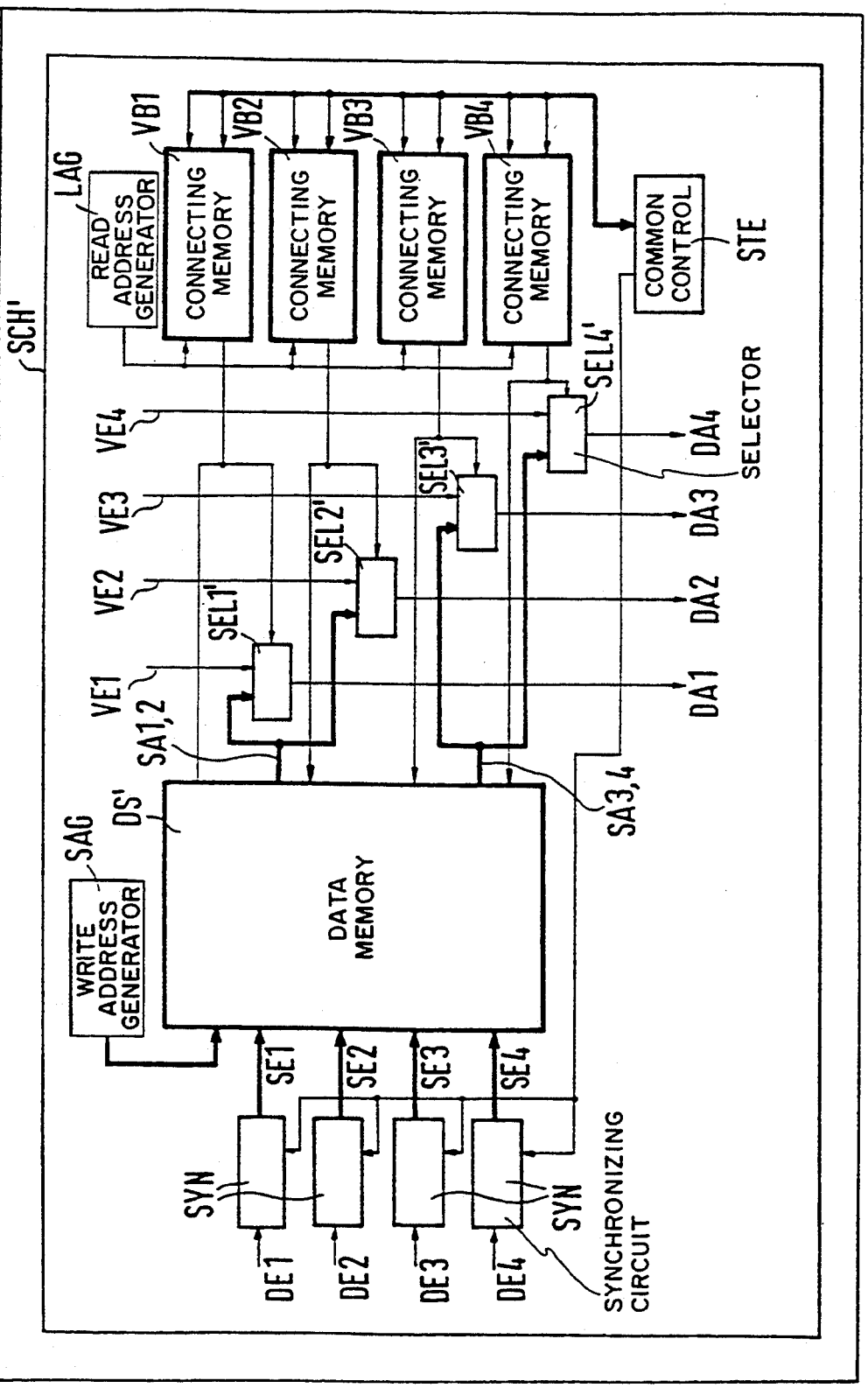
FIG. 5 is a block diagram of a second switch group configuration.

FIG. 1 shows the advantageous configuration of a switching network according to the invention, for a connection node VK of a data transmission system for switching channels, which are arranged in one or more time slots within the framework of a multiplex time signal, which, as a rule, contains a number of switch groups, but only one switch group SCH is shown and represents all switch groups.

Switch group SCH has four data inputs DE1 to DE4, and four data outputs DA1 to DA4. Four connection inputs VE1 to VE4, each of which is connected with one data output of a neighboring switch group, are ready for connection to one of the data outputs DA1 to DA4 of switch group SCH. The data outputs can be directly connected to the switching network outputs, possibly through other switch groups. Each of these outputs leads to a different connection node, or to a different place in the data transmission system. Each data input DE1 to DE4 is connected to one input of the switching network. Each of these inputs is connected to an output of a different connection node, or to a different place in the data transmission system.

The task of a switch group is to arrange any channel of a multiplex time frame, connected to data input DE1 for example, in any sequence with respect to other channels in a frame, where the channel continues through data outputs DA1 to DA4. In other words, the switch group must be able to arrange the sequence of the channels in a multiplex time frame, and to distribute different channels of an incoming multiplex time frame to different multiplex time frames, which are connected to data outputs DA1 to DA4.

This task is fulfilled by a memory DS, by selectors SEL1 to SEL4, by connecting memories VB1 to VB4 in conjunction with a write address generator SAG, a read address generator LAG, synchronizing circuits SYN, and the corresponding connecting lines.

It is now a premise for the fulfillment of this task, that the multiplex time frames in memory inputs SE1 to SE4 be synchronized and have the same frame period, e.g. 125 µs.

The synchronizing circuits SYN, which are connected to a common control STE, make the necessary adaptations. The operation of a synchronizing circuit, as such, is well known.

Memory addresses are assigned to the time slots of the multiplex frame. The write address is then synchronized with the incoming frame. The type of write input into memory DS will be described later.

The memory is read by the connecting memories VB1 to VB4, which indicate the read addresses of one of the four memory outputs SA1 to SA4. For example, connecting memory VB1 has in addressing device (not shown) which indicates the address whose contents are to be transmitted to memory output SA1. Each memory output SA1 to SA4 is connected by one of selectors SEL1 to SEL4 to one of the data outputs DA1 to DA4. In addition to the memory outputs SA1 to SA4, one connection input VE1 to VE4 is present at one of selectors SEL1 to SEL4. The output of each selector SEL1 to SEL4 is connected with one of the data outputs DA1 to DA4.

Each selector SEL1 to SEL4 is controlled by one connecting memory VB1 to VB4, which then selects either memory output SA1 or connection input VE1 for the data output DA1 of selector SEL1.

The switching information, i.e. which channel is to be switched to what data output, and from there into which time slot or time slots, is supplied by control unit STE to the connecting memories VB1 to VB4.

The writing to memory DS is described in FIG. 2 by switched STM-1 frames with VC-11 containers.

The invention does not require STM-1 frames to be present at the memory inputs SE1 to SE4; STM frames with a higher multiplex step and basically even frames of different multiplex steps, can also be present in the individual memory inputs. The STM frames may also hold other virtual containers, e.g. VC-4 or VC-12 containers, or a mixture of different virtual containers. The type of switched virtual containers only affects the depth of memory DS.

It is important for the operation of the switch group, that the individual channels of the incoming data flow are located in the same time slot of the frame. Since the STM-1 frame is received by line, the result is that the same address is assigned to the same column of the STM-1 frame, which results in column-type switching of the STM-1 frame.

The above named conditions can also be fulfilled by plesiochronously transmitted multiplex time frames.

To comply with these conditions, additional measures must be taken with STM-1 frames, because the frames of virtual containers VC can move within the useful range of the STM-1 frame. A so-called pointer is assigned to the individual virtual containers VC, to identify their beginning. To use the switch group according to the invention for switching channels, it is therefore necessary to select the arrangement of the virtual containers in the STM-1 frame, so that the pointer of each virtual container VC starts on the first line of the STM-1 frame. As a result, and depending on the type of container, a virtual container can fill one or more columns in the STM-1 frame. With virtual containers VC-11, these are three columns, which have a distance of 83 columns in STM-1 frames partitioned according to the above named principle, hereinafter called STM-1 frames. The conversion of a STM-1 frame into a STM-1 frame is not the subject of this invention. An advantageous device for converting a STM-1 frame into a STM-1** frame is known from the still unpublished French patent number 90 00 991 also pending as U.S. patent application Ser. No. 647,628.

As a condition of the conversion of a STM-1 frame into a STM-1 frame, the individual channels can be switched by switching columns in the STM-1 frame.

For example, FIG. 2 describes the switching of a STM-1 frame with VC-11 containers. The STM-1 frame contains 270 columns of one byte and 9 lines each. Each byte represents a partial 8-bit signal. Columns 1 to 9 represent the head part SOH and columns 10 to 270 the useful area of the frame. Loading the useful area with VC-11 containers means that 84 channels can be transmitted in the useful area, which are distributed to three equidistant time slots. The upper part of the figure shows an incoming STM-1 frame, in which a channel, with assigned columns 16, 100 and 184, is switched to columns 18, 102 and 186 in an outgoing STM-1 frame (lower part of the figure).

For this purpose, an advantageously used intermediate memory DS has four memory outputs SA1 to SA4, in addition to the four memory inputs SE1 to SE4, one input for the write address and four inputs for the read addresses. The memory DS has a storage capacity of $180 \times 32$ bits, and is divided into four partial areas of $180 \times 8$ bits, with a depth of 180 storage places, where each storage space is able to store one byte. The data of each partial area are written to each memory input SE1 to SE4, i.e. only one write address input is required to assign the incoming part signals to the desired storage place.

The dimension of the memory depth results from the type of the transmitted virtual containers VC and the need to switch channels, whose time slots have a larger column number in the STM-1** frame, to time slots with a lower number (time slot interchange). Three equidistant time slots are arranged in the present type of configuration, in which VC-11 containers are to be switched. In this instance, it is sufficient to store one third of the entire useful area into each point in time. To enable time slot interchange, it must also be possible to switch the time slots from a following third to the preceding third, which finally leads to a depth of 180 storage places (270 storage places: $3 \times 2 = 180$), taking a harmonic memory size into consideration. The number of storage places is calculated accordingly for other virtual containers.

For addressing, each partial area of the memory DS is divided into two blocks B0 and B1, so that an address consists of information about the partial area, the block and storage places 00 to 89. Because of the advantageous addressing of storage places, each storage place has 7 bits to designate the storage place in a block, 1 bit to designate the block, and two other bits to designate the partial area.

Data in memory inputs SE1 to SE4 are written alternately to block 1 or to block 2. The 90 storage places of block 1 are described first, then those of block 2. When part signals from a 270-column frame are stored in two blocks of 90 storage places each, the part signal of one column located on one line is stored e.g. in block 1, but the part signal of the same column located on the next line, is stored in block 2. In that instance, the read address signal to determine the address of the block is inverted by an inverter (not shown) in each connecting memory for reading the second line of the frame, as shown in FIGS. 3A to 3C. This inversion does not take place with virtual containers, whose channels are assigned to an eve number of time slots.

The above described configuration utilizes a so-called 5-port-RAM as the memory DS, i.e. a nonprogrammable memory with one write address input and four independent read address outputs. Such 5-port-RAMs may be built up of two 3-port-RAMs in memory parts SPT1 and SPT2, when the access time to the storage places is very short due to high bit rate frequencies, as shown in FIG. 4. In that event, each memory input SE1 to SE4 is connected to each of the two 3-port-RAMs SPT1 and SPT2, which are constructed like the 5-port-RAM with respect to the input of data, and are addressed in the same way. The only difference is that each of the two 3-port-RAMs has only two independent memory outputs, one has memory outputs SA1 to SA2, and the other has memory outputs SA3 to SA4.

FIG. 5 shows a switch group SCH', which only contains one 3-port-RAM as the memory DS'. Switch group SCH' can be used in instances where the access time to the individual storage places is long enough to sequentially read two storage places, that are independent of each other, during one access period. Switch group SCH in FIG. 1 was modified as follows, so that this capability could be utilized. Memory DS' has only two memory outputs SA1, 2 and SA3, 4 from which memory DS' can be read during multiplex time operation, each of them is connected to two selectors, memory output SA1, 2 with selectors SEL1' and SEL2', and memory output SA3, 4 with selectors SEL3' and SEL4'. Selectors SEL1' to SEL4' have a memory for the intermediate storage of the two part signals, which are read during one access period. Connecting memories VB1 to VB4 then trigger the selectors SEL1' to SEL4'. A corresponding trigger command from the connecting memory VB1 to VB4 to the assigned selectors SEL1' to SEL4' then switches the desired part signal to the individual selectors SEL1' to SEL4', or the part signal that is present in connection input VE1 to VE4 to the corresponding data output DA1 to DA4. Otherwise, switch group SCH' in FIG. 5 is like switch group SCH in FIG. 1.

Figure 6:
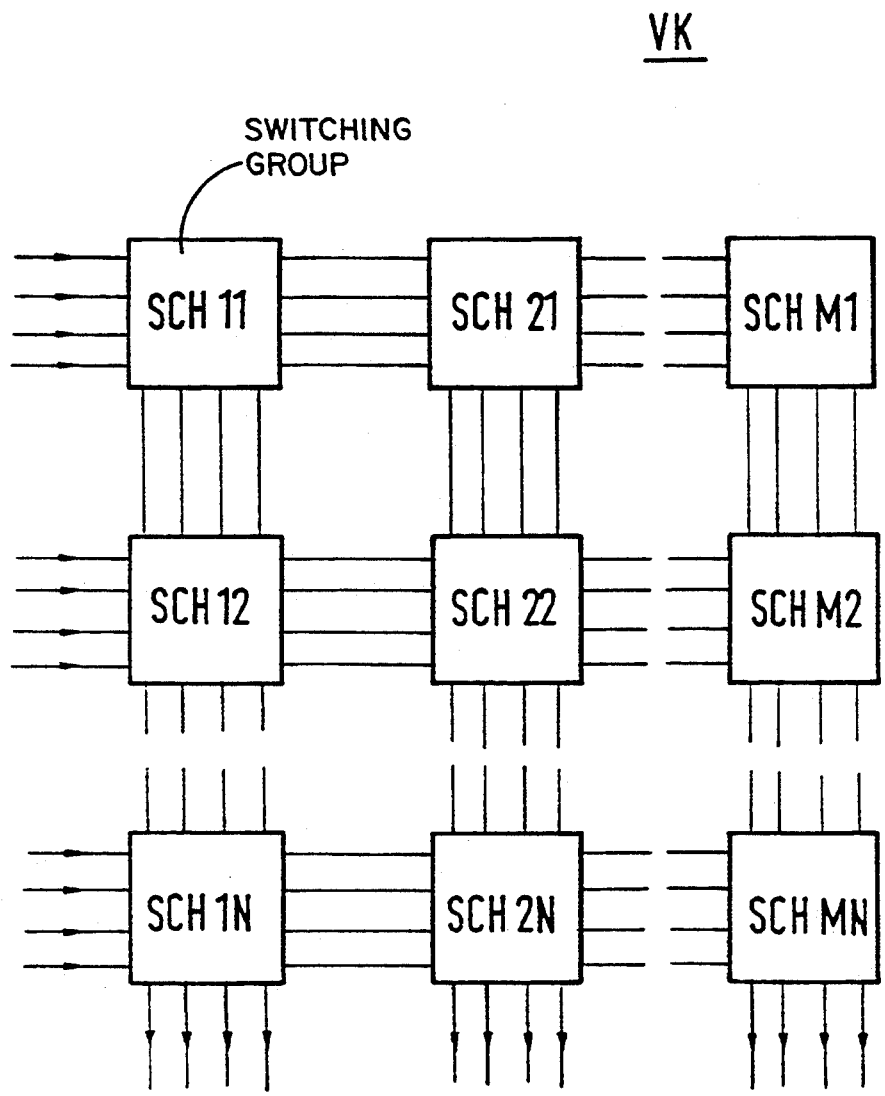
FIG. 6 is a switching network consisting of switch groups arranged in matrix form.

The switch groups may also have a different number of data inputs with respect to data outputs, for example eight data inputs may be directed to a memory with eight memory inputs and four memory outputs. A different number of data inputs or outputs may also be chosen, e.g. eight data inputs and eight data outputs, since, in the final analysis, the number depends on the requirements of the switching network of the connection node VK, which may be constructed as shown in FIG. 6. The indicated switching network has a number of switch groups SCH MN. The switch groups SCH MN are arranged in line and column form, where one column N contains switch groups SCH 11 to SCH N, and one line has M switch groups SCH 11 to SCH M1. M and N are whole numbers larger than 1. In each instance, the inputs of the switching network are connected to the data inputs of each switch group in one line. The data outputs of each switch group in a column are always linked with the connection inputs of the following switch group. The data outputs of the last switch groups in a column represent the switching network's output. The number of the switch groups is determined by the type of switch groups and the required number of the switching network's inputs and outputs.

FIG. 6 only shows one switching network of a connection node for switching in one transmission direction. A switching network for switching in the opposite direction may be constructed in the same manner. As an alternative, the switching network may be equipped with appropriate switching for bidirectional operation.

I claim:

1. A switching network for switching nodes (VK) of a communication system for switching channels which are associated with one or more time slots of a frame of a time-division multiplex signal consisting of component signals,
    wherein at least one switch group (SCH) has a plurality of data inputs (DE1 to DE4) and a plurality of data outputs (DA1 to DA4),
    wherein channels of an incoming time-division multiplex signal received at one of the plurality of data inputs (DE1 to DE4) can be switched to an outgoing time-division multiplex signal at one of the plurality of data outputs (DA1 to DA4),
    wherein said at least one switch group (SCH) includes at least one data memory (DS) which temporarily stores component signals transmitted in individual time slots and has a plurality of memory inputs (SE1 to SE4) and memory outputs (SA1 to SA4) via which data is written and read, respectively, the plurality of memory inputs (SE1 to SE4) being connected to the plurality of data inputs (DE1 to DE4), and the plurality of memory outputs (SA1 to SA4) being respectively connected to the plurality of data outputs (DA1 to DA4), and
    wherein the component signals are addressed on a periodically recurring basis in said at least one data memory (DS),
    characterized in that
    said at least one data memory (DS) has at least two independently readable memory outputs (SA1, SA2; SA3, SA4), and
    each memory output (SA1 to SA4) has associated therewith a connect memory (VB1 to VB4) via which an address for reading said at least one data memory (DS) is specified in order to switch selectively the channels in a selected sequence to a respective one of said plurality of selected data outputs (DA1 to DA4).

2. A switching network as claimed in claim 1, characterized in that a single data memory (DS) consists of two or more memory parts (SPT1, SPT2), that the individual memory parts (SPT1, SPT2) are connected to the same memory inputs (SE1 to SE4), and that each memory part (SPT1, SPT2) has at least two independent memory outputs (SA1, SA2; SA3, SA4).

3. A switching network as claimed in claim 2, characterized in that the memory outputs (SA1 to SA4) of the data memories (DS) of a first switch group (SCH 12)

and connection inputs (VE1 to VE4) provided from a second switch group (SCH 11) are selectively connectable in the first switch group (SCH 12) to the data outputs (DA1 to DA4) by means of selectors (SEL1 to SEL4), each memory output (SA1 to SA4) having one or more selectors (SEL1 to SEL4) associated therewith, and that each memory output (SA1 to SA4) and the associated selector (SEL1 to SEL4) combine to form a switching unit which receives its switching control information from the connect memories (VB1 to VB4).

4. A switching network as claimed in claim 3, characterized in that several connect memories (VB1, VB2; VB3, VB4) are connected to one memory output (SA1, 2; SA3, 4) and the associated selectors (SEL1', SEL2'; SEL3', SEL4') on a time-division multiplex basis.

5. A switching network as claimed in claim 3, characterized in that at least two switch groups (SCH11, SCH12, SCH1N) which have different data inputs (DE1 to DE4) and whose data outputs (DA1 to DA4) are interconnected, at least in part, via the selectors (SEL1 to SEL4) of a switch group (SCH12, SCH1N) are arranged in a column.

6. A switching network as claimed in claim 3, characterized in that at least two switch groups (SCH11, SCH21, SCHM1) which have separate data outputs (DA1 to DA4) and which are connected, at least in part, to the same data inputs (DA1 to DA4) are arranged in a row.

7. A switching network according to claim 6, characterized in that a synchronizing device is provided between the data inputs (DE1 to DE4) and the memory inputs (SE1 to SE4), and that the memory or memories (DS) and the connecting memories (VB1 to VB4) are supplied with the same phase and are synchronized with a common frame phase.

8. A switching network according to claim 5, characterized in that a synchronizing device is provided between the data inputs (DE1 to DE4) and the memory inputs (SE1 to SE4), and that the memory or memories (DS) and the connecting memories (VB1 to VB4) are supplied with the same phase and are synchronized with a common frame phase.

9. A switching network as claimed in claim 1, characterized in that the memory outputs (SA1 to SA4) of the data memories (DS) of a first switch group (SCH 12) and connection inputs (VE1 to VE4) provided from a second switch group (SCH 11) are selectively connectable in the first switch group (SCH12) to the data outputs (DA1 to DA4) by means of selectors (SEL1 to SEL4), each memory output (SA1 to SA4) having one or more selectors (SEL1 to SEL4) associated therewith, and that each memory output (SA1 to SA4) and the associated selector (SEL1 to SEL4) combine to form a switching unit which receives its switching control information from the connect memories (VB1 to VB4).

10. A switching network as claimed in claim 9, characterized in that several connect memories (VB1, VB2; VB3, VB4) are connected to one memory output (SA1, 2; SA3, 4) and the associated selectors (SEL1', SEL2'; SEL3', SEL4') on a time-division multiplex basis.

11. A switching network as claimed in claim 1, characterized in that in the data memory (DS), two blocks (B1, B2) with an identical number of addressable locations are provided for each memory input (SE1 to SE4), and an address is determined by the designation of a respective block (B1, B2) and by the designation of an addressable location within the respective block.

12. A switching network as claimed in claim 3, characterized in that at least two switch groups (SCH 11, SCH 12, SCH 1N) which have different data inputs (DE1 to DE4) and whose data outputs (DA1 to DA4) are interconnected, at least in part, via the selectors (SEL1 to SEL4) of a switch group (SCH 12, SCH 1N) are arranged in a column; and at least two switch groups (SCH 11, SCH 21, SCH M1) which have separate data outputs (DA1 to DA4) and which are connected, at least in part, to the same inputs (DA1 to DA4) are arranged in a row.

* * * * *